3,051,718
PRODUCTION OF PHTHALOCYANINE COLORS IN PIGMENTARY STATE
Norris G. Wheeler, Wilmington, Del., assignor to E. I. du Pont de Nemours and Company, Wilmington, Del., a corporation of Delaware
No Drawing. Filed Jan. 25, 1960, Ser. No. 4,168
6 Claims. (Cl. 260—314.5)

This invention relates to the production of copper and metal-free phthalocyanine colors in pigmentary state. It is an object of this invention to provide a simple and economical process for conversion of the aforegoing phthalocyanine coloring matters from crude or coarsely crystalline state to the finely divided crystalline form which is suitable for direct use in paints, varnishes and inks, and which is commonly referred to as the pigmentary state. A further object of this invention is to provide a method for the above conversion which, however, will not be attended by uncontrollable alteration of the crystalline phase of the color in the direction of alpha, that is, it will either not disturb the crystalline phase at all or will change some or all of its alpha content to beta. A still further object is to provide a method as aforesaid which is adapted for the production of optional shades of copper phthalocyanine (or metal-free phthalocyanine), which shades are intermediate to the reddish shade of blue of the alpha phase and the greenish shade of blue of the beta phase. A further object of this invention is to provide a method as aforesaid, which is economically adapted for the production of said colors in substantially exclusively the beta phase, if such a result is desired. Various additional objects and achievements of this invention will become apparent as the description proceeds.

The nature of the pigmentary state in the case of phthalocyanine colors and the problems involved in its achievement are discussed more fully in U.S. Patents Nos. 2,833,782 and 2,833,783.

The nature of the two principal crystalline phases existing in halogen-free copper phthalocyanine, and the crystallographic definitions of the two states designated as alpha and beta are given more fully in D. P. Graham's U.S. Patents 2,556,728 and 2,556,730. The existence of a similar two-phase relationship in the case of metal-free phthalocyanine has been pointed out and described by O. Stallmann in U.S. Patent 2,556,729. In this application, the alpha and beta crystalline phases of copper-phthalocyanine and of metal-free phthalocyanines will be understood in the same senses as in these patents.

Several methods for converting crude (non-pigmentary) phthalocyanine colors into the pigmentary state have been suggested or actively practiced in the art and described in the patent literature. But many of them are associated with an uncontrollable change in crystalline phase in the direction of alpha, so that the product often ends up exclusively in the alpha phase. In such cases, where the process yields predominantly alpha phase, the color is not stable to storage in aromatic liquids of the types which commonly form part of the liquid vehicle in paints and varnishes.

A brief summary of the conversion methods hitherto practiced or suggested, without any attempt to exhaust the list, is as follows:

*Acid pasting.*—This involves dissolving the crude pigment in a strong acid, such as sulfuric or phosphoric, and precipitating by dilution with water. This process invariably leads to the alpha phase.

*Salt-milling.*—This method involves dry grinding of the pigment with salt and is described and claimed by Lang and Detrick in U.S. Patent 2,402,167. It also gives the alpha form.

*Ball milling* in the presence of organic liquids, preferably an oxygenated aliphatic liquid. This method is described and claimed by F. W. Lane in U.S. Patent 2,556,726, and yields the beta phase. It will be remembered, incidentally, that chlorine-free phthalocyanine crudes as produced by the customary methods (and before they have undergone other treatments) are generally in the beta phase.

*Salt-solvent milling.*—This method consists of adding a limited quantity of organic liquid to the salt-milling process. It is described and claimed by D. P. Graham in U.S. Patents 2,556,728 and 2,556,730 and gives the product in beta phase, but like the basic salt-milling process it still requires the extra operation of leaching out the water-soluble salt from the product, and freeing the latter of excess water.

*Acid-slurry or swelling processes.*—One such process, applied to polychloro phthalocyanines, is described and claimed by G. Barnhart in U.S. Patent 2,765,319. As applied to phthalocyanine colors in general, it is described in British Patent 503,666 and in FIAT Report 1313, vol. III, pages 298–303. When applied to chlorine-free phthalocyanine, it produces the alpha phases.

In copending application of John W. Minnich, Serial No. 783,104 (filed December 29, 1958), a process is described and claimed which involves first ball milling copper phthalocyanine in the absence of any solid or liquid grinding aids and then subjecting the milled product to a swelling operation with a limited quantity of relatively concentrated sulfuric acid (65 to 85%). The method produces the alpha phase. It offers the advantage of a relatively short treatment period and of avoiding the need of separating the product from solid diluents or from organic liquids.

I have now found that if chlorine-free copper phthalocyanine or metal-free phthalocyanine is ball-milled in the absence of solid diluents but in the optional presence or absence of a limited quantity of a crystallizing organic liquid (as defined below, and in quantity insufficient to form a suspension of the color in the liquid) and if the milled product is then subjected to acid-swelling but using certain particular acids and concentrations as defined below, the milled product will either undergo no change in phase at all through the acid-swelling treatment or will change some or all of its alpha content, if any is present, to beta. Thus, if the color after said ball-milling operation is entirely in beta phase, the product of the acid-swelling treatment according to my invention will be entirely in the beta phase. If the color after ball-milling is entirely or partially in the alpha phase, it may come through the process with the same proportion of alpha phase or with an increased proportion of beta phase, depending on the nature of the organic liquid employed as additive in the pre-milling step.

This is a distinct difference from the results obtained in said process of said John W. Minnich, which uses sulfuric acid in the acid-swelling step and achieves complete conversion of the milled product into the alpha phase, regardless of what phase it was in at the end of the dry milling.

The particular acids aforementioned and which I found suitable for the purposes of this invention are characterized by being liquid at room temperature or at least at some temperature below 100° C., and by having a dissociation constant K of value not exceeding $5 \times 10^{-2}$.
Practically available illustrations of such acids are:

Dichloroacetic, $K = 5 \times 10^{-2}$;
Phosphoric, $K_1 = 1.1 \times 10^{-2}$;
Monochloroacetic, $K = 1.4 \times 10^{-3}$;
Formic, $K = 1.77 \times 10^{-4}$;
Acetic, $K = 1.75 \times 10^{-5}$;
Propionic, $K = 1.4 \times 10^{-5}$.

The other condition in connection with the acid is that its concentration shall be below the point at which the acid begins to dissolve substantial quantities of the pigment. By "substantial quantities" here I mean quantities that can be recovered by analytical procedure, for instance by filtering off the acid and diluting with water. Thus, except for phosphoric acid, none of the aforementioned acids dissolve copper phthalocyanine to any recoverable extent at any concentration of the acid. Therefore, dichloroacetic, acetic, formic, etc., acids can be used in the swelling step of this invention at a concentration of 100%. Phosphoric acid, on the other hand, begins to dissolve copper phthalocyanine at a concentration of 86%.

On the other hand, concentration of acid must be sufficient to form a salt with the color. In the case of phosphoric acid, this lower limit is at about 82%, while in the case of the other acids it is close to 100%. Therefore, the practical values of acid concentration to be employed according to this invention are 82 to 86% in the case of phosphoric acid and essentially 100% in the case of the several organic acids above named.

Except for the differences in the value of the ionization constant, I am unable to explain why phosphoric acid, acetic acid, etc., should behave differently, as above noted, than sulfuric acid in the acid-swelling step. I am not aware that any practical distinctions between phosphoric acid and sulfuric acid have been observed or reported in the literature heretofore, insofar as acid-pasting or acid-slurrying of phthalocyanine coloring matters is concerned. I find, however, the aforegoing acids and concentrations to be critical factors in my process. In the case of phosphoric acid, if its strength (by weight) is much below 80%, the conversion of the product into pigmentary form is incomplete, and the product is dull and tinctorially weak. Above 86%, the alpha phase is formed in increasing proportions. For best results, I recommend the restricted range of 82 to 85.5%. In the case of acetic acid, the critical concentration is about 100%. In other words, commercial, glacial acetic acid is about the only practical strength of this acid to employ.

My discovery above is of great practical importance, because by modifying the Minnich process according to this invention, I am able to get not only the practical advantages of the Minnich process but also the advantage of being able to control the shade of the final pigmentary product by regulation and adjustment of the beta:alpha phase proportion in the milled product. The final product will then possess an optional, predetermined shade, between the reddish blue of the alpha phase and the greenish blue of the beta phase.

Thus, dry milling in the absence of a crystallizing liquid of a crude copper phthalocyanine which consists essentially of the beta phase generally transforms at least part of the product into the alpha phase. The degree of transformation (beyond a certain initial spurt) will generally increase as the length of dry milling is increased. Therefore, by regulating the time-length of milling, the beta:alpha ratio of the product can be set at an arbitrary value. My novel acid-swelling procedure then reduces the particle-size of the product to pigmentary state, without disturbing substantially the beta:alpha ratio.

Again, as taught in the above Graham patents, addition of a small amount of certain organic liquids, sufficient to wet the particles of the mass being milled but not enough to produce a continuous liquid phase, acts to stabilize any beta crystals of the pigment against transformation into the alpha phase during milling. The Graham patents apply this remedy to a mass consisting of salt and pigment. I now find that the same remedy works also for a mass of pigment free of solid diluents and being milled in a ball-mill or similar apparatus. Therefore, by starting with a crude which is essentially all beta and adding to the same as it is being ball-milled a small quantity of a "crystallizing liquid" (an organic liquid in which the alpha form upon storage tends to change spontaneously into the beta form), the eventual pigmentary product produced according to this invention will be all in the beta phase.

In the discussion above, I have repeatedly employed the expression "ball-milling" in connection with the preliminary mechanical treatment. However, this term is meant merely as a short-hand expression for any type of milling wherein the pigment is subjected to shear and attrition. Use of "Cyl-pebs" (short, rod-shaped and relatively coarse metallic grinding units) represents another practical illustration of such milling.

The crystallizing liquid employed in the milling step, when such employment has been decided upon, may be any of those indicated as suitable in the aforegoing patents to Graham and to Lang. For instance, it may be xylene, toluene, kerosene, tetrachlorethane, tetrachlorethylene, trichlorobenzene, ethyl alcohol, isopropanol, acetone, amyl acetate, etc. It is advantageous, however, to choose a liquid which is easily removable from the pigment either by evaporation or steam distillation prior to the acid-swelling treatment or by the acid itself during the treatment. In the latter group are included organic liquids which are soluble in phosphoric acid or acetic acid of the concentrations above discussed, and as specific illustrations thereof may be named aniline, the toluidines, mono-, di- or triallyl amine, tetrachlorethylene, vinyl acetate, methyl acrylate, methyl methacrylate, benzyl amine, 4-vinyl pyridine, quinoline, allyl alcohol, etc.

The quantity of crystallizing liquid to be employed should be sufficient to wet the particles of the pigment as it is being milled, without forming a doughy mass therewith. Quantities from 0.5 to 10.0% by weight of the pigment are generally sufficient. Near the lower limit mentioned, the product of the milling step will usually contain considerable proportions of the alpha phase (the exact proportion being dependent on the particular crystallizing liquid selected), but in most cases this fraction of alpha (or at least the greater portion of it) will disappear (i.e. be converted to beta) during the subsequent swelling step.

The quantity of acid employed in the swelling step may vary within wide limits. Quantities from 1.5 to 10 parts by weight of 85% $H_3PO_4$ per unit weight of pigment are satisfactory. A convenient range is 3 to 5 parts of the acid per part of pigment. In the case of glacial acetic acid, quantities equal in weight to that of the pigment have also been found satisfactory.

The acid-swelling step may be carried out at room temperature or at any other convenient temperature, say from 10° C. to 85° C. Of course, temperatures of 20° to 40° C. will be found most convenient. The time of contact between acid and pigment is not critical. Usually, salt formation with the chosen acid (which incidentally is believed to be the mechanism by which the acid-swelling process works), is achieved as soon as the particles have become fully wetted with the acid. However, to insure fullest conversion into this salt, the contact between acid and pigment is preferably maintained for about 1 hour. Gentle stirring may be applied to the mass during this period, but is not essential. Vigorous agitation or attrition is definitely superfluous.

Following complete salt formation, the mass is diluted with water to hydrolyze off the acid. In this hydrolysis step, enough water is added to reduce the acid concentration to about 10% or lower, and the mass is preferably brought to a boil, but standing for a longer time at room temperature will also achieve the same result. Following hydrolysis, the pigmentary product is filtered off, washed with water and then either concentrated into a marketable aqueous paste or evaporated to dryness.

Without limiting this invention, the following examples are given to illustrate my preferred mode of operation. Parts mentioned are by weight.

EXAMPLE 1

100 parts of nonpigmentary, beta copper phthalocyanine and 6 parts of aniline were charged to a steel ball mill containing about 2300 parts of "Cyl-pebs" (steel rods approximately 5/8" x 1"). The size of the mill was such that the full charge of pigment and "Cyl-pebs" occupied approximately two thirds of the total volume of the mill. The mill was rotated at about 75% of the critical speed (the critical speed is that at which the centrifugal force overcomes the force of gravity so that the grinding elements are retained against the outer wall of the mill) for 24 hours. The mill was discharged through a screen to separate pigment from the grinding elements. 50 parts of this milled material were mixed with 125 parts of 85% phosphoric acid, using only sufficient agitation to completely wet the dry powder. The mixture of acid and pigment was allowed to stand for 1 hour at 40° C. after which 1,000 parts of water were added with good agitation and the slurry was heated to the boil and stirred for 1 hour at the boil. The slurry was then filtered, washed free of acid and dried at 60° C. to obtain a bright, green-blue copper phthalocyanine pigment of excellent tinctorial strength when tested in the conventional ink drawdowns. Both the dry milled pigment and the final acid treated product were entirely in the beta crystal phase.

EXAMPLE 2

The procedure described in Example 1 was repeated exactly except that 50 parts of the milled material were mixed with 250 parts of 82.7% phosphoric acid at 30° C. for 1 hour. A bright green-blue, beta phase copper phthalocyanine pigment of excellent tinctorial strength was obtained.

Slightly weaker and duller products were obtained when lower concentrations (80%, 75% and 70%) of phosphoric acid were used. The degree of dullness and weakness increased as the concentration of the acid was decreased.

When higher concentrations (87.3%, 90% and 95%) of phosphoric acid were used redder shade products were obtained. These products contained approximately 75% alpha phase copper phthalocyanine.

EXAMPLE 3

The procedure described in Example 1 was repeated exactly except that the pigment and acid were agitated at 60° C. and allowed to stand for 1 hour at 60° C., after which it was diluted and boiled as in Example 1. A green-blue, beta phase copper phthalocyanine pigment of excellent tinctorial strength was obtained.

A product of similar quality was obtained when the mixture of milled material and acid was held at 85° C. instead of 60° C.

When operating at 60° C. as described above, the use of 100 parts of acid (instead of 125 parts) gave a product of satisfactory quality. Likewise, the use of 75 parts of acid resulted in a magma which was penetrated by the acid more slowly, but the final product was of satisfactory quality.

EXAMPLE 4

The procedure described in Example 1 was repeated exactly except that the mixture of milled material and acid was held at 10° C. instead of 40° C., whereupon it was diluted and boiled as in Example 1. A green-blue, beta phase copper phthalocyanine pigment of excellent tinctorial strength was obtained.

EXAMPLE 5

The procedure described in Example 1 was repeated exactly except that 500 parts instead of 125 parts of 85% phosphoric acid were used. A green shade, beta phase copper phthalocyanine of excellent tinctorial strength was obtained.

EXAMPLE 6

A 1,670 gal. ball mill, approximately 8 ft. in length and 6 ft. in diameter, and containing approximately 18,000 lbs. of 5/8" x 1" "Cyl-pebs," was charged with 1,000 lbs. of nonpigmentary, beta copper phthalocyanine. The mill was rotated at about 75% of the critical speed for 6 hours after which the dry powder was discharged through a screen which retained the "Cyl-pebs." 50 parts of this milled powder were mixed with 250 parts of 85% phosphoric acid, using only sufficient agitation to completely wet the dry powder. The mixture of acid and pigment was allowed to stand for 1 hour at 20° C., after which 1,000 parts of water were added with good agitation, and the slurry was heated to the boil and stirred for 1 hour at the boil. The slurry was then filtered; the pigment was washed free of acid and dried at 60° C. to obtain a copper phthalocyanine pigment of excellent tinctorial strength. Both the dry milled powder and the final acid treated product were 60% beta phase copper phthalocyanine.

Likewise, the starting material for this example may be a mixture of the alpha and beta forms of copper phthalocyanine. Thus, for shading purposes, it is possible to adjust the ratio of alpha and beta forms in the starting material in any desired proportion. Or, the alpha-beta mixture may be produced from beta copper phthalocyanine in the premilling step, as illustrated in this example.

The present invention may also be used to advantage when it is desired to produce pigment mixtures containing, for example, the beta phase of copper phthalocyanine and varying proportions of another phthalocyanine which normally occurs only in the alpha phase, such as a chlorocopper phthalocyanine, sulfo-copper phthalocyanine, etc.

EXAMPLE 7

100 parts of nonpigmentary, beta metal free phthalocyanine was charged to a steel ball mill containing about 3800 parts of "Cyl-pebs." The size of the mill was such that the full charge of pigment and "Cyl-pebs" occupied approximately two-thirds of the total volume of the mill. The mill was rotated at about 75% of the critical speed for 20 hours. The mill was discharged through a screen suitable for retaining the "Cyl-pebs." 50 parts of this milled powder were mixed with 250 parts of 85% phosphoric acid, using only sufficient agitation to completely wet the dry powder. The mixture of acid and pigment was allowed to stand for 1 hour at 30° C. after which 1,000 parts of water were added with good agitation and the slurry was heated to the boil and stirred for 1 hour at the boil. The slurry was then filtered, the pigment was washed free of acid and dried at 60° C. to obtain a metal free phthalocyanine of excellent tinctorial strength. Both the dry milled powder and the final acid treated product were about 67% alpha phase metal free phthalocyanine and 33% in the beta phase.

EXAMPLE 8

100 parts of nonpigmentary, metal-free phthalocyanine and 2.5 parts of methyl acrylate were milled for 24 hours in a steel ball mill containing 2300 parts of "Cyl-pebs." 50 parts of the milled material were mixed with 125 parts of 85% phosphoric acid, using only sufficient agitation to completely wet the dry powder. The mixture of acid and pigment was allowed to stand for 1 hour at 30° C. after which 1,000 parts of water were added with good agitation, and the slurry was heated to the boil and stirred for 1 hour at the boil. The slurry was then filtered and washed free of acid to obtain a bright, green-blue, beta phase, metal-free phthalocyanine pigment of excellent tinctorial strength when tested in the conventional ink drawdowns.

EXAMPLE 9

100 parts of nonpigmentary, beta copper phthalocyanine and 6.2 parts of methyl acrylate were milled for 24 hours in a steel ball mill containing 2300 parts of "Cyl-pebs." 50 parts of the milled material were mixed with 50 parts of glacial acetic acid, using only sufficient agitation to completely wet the dry powder. The mixture of acid and pigment was then treated as in Example 1, and yielded a product of similar qualities.

In the above example, when 50 parts of the milled material were mixed with 50 parts of 95% acetic acid, a duller and weaker product was obtained.

In the same example, when 50 parts of the milled material were mixed with a mixture of 45 parts of glacial acetic acid and 5 parts of acetic anhydride, a duller and weaker product was obtained.

In the same example, when the quantity of methyl acrylate employed was reduced to 1.9 parts per 100 parts of pigment, the dry milled pigment was approximately 22% in the beta crystal phase, while the final, acid-treated product contained 89% of pigmentary beta copper phthalocyanine.

EXAMPLE 10

100 parts of nonpigmentary, beta copper phthalocyanine and 4.4 parts of vinyl acetate were milled for 24 hours in a steel ball mill containing 2300 parts of "Cyl-pebs." 50 parts of the milled material were mixed with 125 parts of 85% phosphoric acid, using only sufficient agitation to completely wet the dry powder. The mixture of acid and pigment was then treated as in Example 1, and yielded a product of similar qualities. Both the dry milled pigment and the final acid treated product were entirely in the beta crystal phase.

When 3.1 parts of methyl acrylate was used in place of vinyl acetate in the above example, the dry milled pigment was approximately 75% in the beta crystal phase but the final, acid-treated product was entirely in the beta crystal phase.

When only 1.9 parts of methyl acrylate were used in the same example, the dry milled pigment was approximately 22% in the beta crystal phase. The final, acid-treated product, however, was approximately 60% in the beta crystal phase and was redder in shade than the product obtained above with 3.1 parts of methyl acrylate.

EXAMPLE 11

100 parts of nonpigmentary, beta copper phthalocyanine and 2.5 parts of methyl acrylate were milled as in Example 1 for 24 hours in a steel ball mill containing 2300 parts of "Cyl-pebs." The milled pigment was 60% in the beta crystal phase. Portions of the milled pigment were mixed with different acids and allowed to stand for 1 hour, then the pigment-acid mixtures were hydrolyzed with water according to the procedure described in Example 1.

The acids used, ionization constants of the acids, parts of acid per part of pigment, the temperature of the acid-pigment mixture and the crystal modification of the final pigmentary products are shown in the following table.

Table I

| Acid | Ionization Constant | Parts of Acid | Temp. ° C. | Product |
| --- | --- | --- | --- | --- |
| 70% Sulfuric ($K_1$) | $4 \times 10^{-1}$ | 3.75 | 30 | 100% Alpha. |
| Trichloroacetic | $2 \times 10^{-1}$ | 3 | 80 | 99% Alpha. |
| Dichloroacetic | $5 \times 10^{-2}$ | 3 | 80 | 95% Beta. |
| 85% Phosphoric ($K_1$) | $1.1 \times 10^{-2}$ | 2.50 | 30 | 95% Beta. |
| Monochloroacetic | $1.4 \times 10^{-3}$ | 3 | 80 | 100% Beta. |
| Formic | $1.77 \times 10^{-4}$ | 1 | 80 | 100% Beta. |
| Acetic | $1.75 \times 10^{-5}$ | 1 | 80 | 99% Beta. |
| Propionic | $1.4 \times 10^{-5}$ | 1 | 80 | 100% Beta. |

It will be noted that the acids whose K was larger than $5 \times 10^{-2}$ gave a product which was essentially alpha; those of K-value equal to or less than $5 \times 10^{-2}$ gave products which were essentially beta.

It will be noted further that monochloroacetic acid is solid at room temperature, but is liquid at the temperature at which it was used (80° C.).

It will be understood that the details of the above examples may be varied within the skill of those engaged in this art. Thus, the length of dry milling in the absence of a crystallizing liquid will be controlled by the shade of redness desired in the product (or the beta-alpha ratio in the product) as determined by experience or by periodic testing of samples taken from the mill. In the presence of a solvent, the optimum length of milling can likewise be readily determined by experiment and observation, but the goal here is to achieve a final product (after acid-swelling) of the desired pigmentary qualities.

The advantages of my invention will now be readily apparent. In summary, my invention enables the transformation of nonpigmentary beta to pigmentary beta phthalocyanines while (a) Eliminating solid grinding aids, such as inorganic salts;

(b) Providing a means of controlling the exent of beta phase content in the finished pigment (thus controlling the shade and stability of the product);

(c) Providing a simple and economical procedure (smaller mills and shorter milling time), the results being easily reproduced without need for meticulous and frequent control tests.

I claim as my invention:

1. In a process of acid-swelling a premilled chlorine-free phthalocyanine color of the group consisting of copper phthalocyanine and metal-free phthalocyanine, the improvement which consists of selecting for said swelling treatment an acid which is liquid at the temperature of the treatment and which has an ionization constant not greater than $5 \times 10^{-2}$ and not less than $1.4 \times 10^{-5}$, the concentration of said acid being sufficient to react with said color to form a salt therewith but insufficient to dissolve substantial quantities of said color.

2. A process of reducing the particle size of a phthalocyanine coloring matter of the group consisting of copper phthalocyanine and metal-free phthalocyanine and which color initially consists at least in part of the beta crystalline form, which comprises milling said coloring matter in an apparatus having an attrition and shearing action, said milling being done in the absence of solid diluents but in the presence of a crystallizing liquid, the quantity of said liquid not exceeding 0.10 part by weight for each part by weight of said coloring matter, then wetting out the milled product with an acid selected from the group consisting of dichloracetic, phosphoric, monochloracetic, formic, acetic and propionic, said acid being employed in concentration sufficient to form a salt with said coloring matter without dissolving substantial quantities thereof, diluting the acidified pigment mass with water and washing the pigment free of acid.

3. A process as in claim 2, wherein the crystallizing liquid is one that is soluble in acid, whereby it will be automatically removed in the subsequent wetting out and washing steps.

4. A process as in claim 2, wherein the wetting out is effected at ambient temperature by contacting 1 part by weight of the milled product with from 1.5 to 10 parts by weight of said acid for 1 hour, and wherein the mass is then diluted with water, heated to boiling for 1 hour and filtered.

5. A process of reducing the particle size of a phthalocyanine coloring matter of the group consisting of copper phthalocyanine and metal-free phthalocyanine and which color initially consists at least in part of the beta crystalline form, which comprises milling said coloring matter in an apparatus having an attrition and shearing action, said milling being done in the absence of solid diluents but in the presence of an organic liquid selected from the group consisting of aniline, the toluidines, monoallyl-, diallyl- and triallylamine, tetrachlorethylene, vinyl acetate, methyl acrylate, methyl methacrylate, benzyl amine, 4-vinyl pyridine, quinoline and allyl alcohol, the quantity of said organic liquid not exceeding 0.10 part by weight for each part by weight of said coloring matter, then wetting out the milled product with phosphoric acid of 80 to 86% concentration, followed by dilution with water and washing the pigment free of acid.

6. A process for converting into pigmentary form a nonpigmentary color of the group consisting of copper phthalocyanine and metal-free phthalocyanine, which comprises milling said color, in the absence of solid diluents, in a milling apparatus having an attrition and shearing action, said milling being done in the presence of an organic liquid selected from the group consisting of aniline, the toluidines, monoallyl-, diallyl- and triallyl-amine, tetra-chlorethylene, vinyl acetate, methyl methacrylate, benzyl amine, 4-vinyl pyridine, quinoline and allyl alcohol, wetting out the milled product thus obtained with glacial acetic acid, and then washing out the acid.

References Cited in the file of this patent
UNITED STATES PATENTS

| | | |
|---|---|---|
| 2,402,167 | Lang et al. | June 2, 1942 |
| 2,716,649 | Brouillard | Aug. 30, 1955 |

FOREIGN PATENTS

| | | |
|---|---|---|
| 503,666 | Great Britain | Apr. 12, 1939 |

OTHER REFERENCES

FIAT, Final Report #1313, vol. III, pages 298–303 (1948).